(12) United States Patent
Markey, Jr. et al.

(10) Patent No.: US 6,180,939 B1
(45) Date of Patent: *Jan. 30, 2001

(54) METHOD AND APPARATUS FOR TEMPERATURE COMPENSATION OF MEASUREMENTS FROM A NON-CONTACT SENSOR

(75) Inventors: Myles Markey, Jr., Ann Arbor; Dale R. Greer, Novi; Stephen James Tenniswood, Rochester, all of MI (US); Jesper Christensen, Freising (DE)

(73) Assignee: Perceptron, Inc., Plymouth, MI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/205,742

(22) Filed: Dec. 4, 1998

(51) Int. Cl.$^7$ ............................................. H01J 7/24
(52) U.S. Cl. .................. 250/238; 250/559.1; 250/559.4; 340/501
(58) Field of Search ............... 250/238, 559.1, 250/559.4, 559.45; 340/501, 555–557, 588; 364/557; 33/702; 356/376

(56) References Cited

U.S. PATENT DOCUMENTS

| | | | |
|---|---|---|---|
| 4,949,469 | * | 8/1990 | Wachtler ............................... 33/702 |
| 5,446,971 | | 9/1995 | Neumann ............................... 33/702 |

* cited by examiner

*Primary Examiner*—Que T. Le
(74) *Attorney, Agent, or Firm*—Harness, Dickey & Pierce, P.L.C.

(57) ABSTRACT

A temperature compensation system (300) is provided for compensating measurements from a sensor (240). A temperature transducer (310) is placed in close proximity to a manufacturing workstation as a means of measuring the ambient temperature associated with the workstation (200). A reference workpiece (100) is placed within a sensing zone of the sensor (240). The system (300) includes a temperature compensating module (320) that is connected to the sensor (240) and to the temperature transducer (310) for determining a baseline measurement of the reference workpiece at a reference temperature. The temperature compensating module (320) is further adapted for collecting a plurality of measurements of the reference workpiece over a plurality of temperatures for establishing a relationship between these measurements and their corresponding temperature values. In addition, a workpiece measuring module (330) is also connected to the sensor (240) and to the temperature transducer (310) for measuring a first workpiece at a first temperature, whereby the sensor measurement is compensated for temperature using this relationship. In this way, the temperature compensation system (300) compensates the sensor measurement for physical changes in any of the components of the workstation that are caused by fluctuations in ambient temperature. Rather than compensate for ambient temperature changes, the temperature compensation system (300) may also be adapted to compensate sensor measurements based on process driven temperature changes (i.e., a "hot" workpiece).

18 Claims, 7 Drawing Sheets

METHOD AND APPARATUS FOR TEMPERATURE COMPENSATION OF MEASUREMENTS FROM A NON-CONTACT SENSOR

BACKGROUND OF THE INVENTION

The present invention relates generally to machine vision equipment, and more particularly, relates to an apparatus and method for temperature compensation of three-dimensional measurements from a non-contact sensor in a workpiece manufacturing station.

Demand for higher quality has pressed manufacturers of mass produced articles, such as automotive vehicles, to employ automated manufacturing technology to assemble, weld, finish, gauge and test manufactured articles. Machine vision is a key part of today's manufacturing environment. Machine vision systems are used with robotics and as in-process gauging equipment to monitor and improve the manufacturing process and thereby improve quality and reduce cost of the articles produced.

In a typical manufacturing environment, there may be a plurality of different non-contact sensors, such as optical sensors, positioned at various predetermined locations within the workpiece manufacturing, gauging or testing station. The workpiece is placed at a predetermined, fixed location within the station, allowing various predetermined features of the workpiece to be examined by the sensors. Preferably, all of the sensors are properly positioned and carefully calibrated with respect to a fixed frame of reference, such as a common reference on the workpiece or at the workstation.

Achieving high quality manufactured parts requires highly accurate, precisely calibrated machine vision sensors. Not only must a sensor have a suitable resolution to discern a manufactured feature of interest, the sensor must accurately measure with respect to an external frame of reference so that relevant data regarding the manufactured parts can be reported.

One area of concern with sensor accuracy is measurement variations caused by temperature changes at the workpiece manufacturing station. Typically, the entire manufacturing assembly facility will experience significant fluctuations in temperature throughout the workday. As the temperature changes, the entire workpiece manufacturing station changes, including each of its various components. It may be possible to model the response of each component of a workstation with respect to changes in temperature. For instance, it is known that all of the components that comprise the inspection station: the workpiece, the tooling that transports and secures the workpiece in the station, the sensor mounting structure, the sensor mounting hardware, and the sensors, will expand and contract with temperature variations and that these physical changes in the components of the workstation will also cause deviations in the resulting measurements. Consequently, the enormity of the task of accurately modeling each of the relevant components in the typical manufacturing workstation can be readily appreciated.

Therefore, rather than attempting to empirically develop suitable compensation data to correct the response of each workstation component, a temperature compensation system of the present invention employs a system approach. Each of the components of the workstation that may be affected by variations in temperature are viewed as a system. A characteristic curve is determined that represents resulting variations in a sensor's measurements caused by changes in temperature. In this way, the characteristic curve incorporates all of the variables in the system that may affect a measurement from that particular sensor and thus provides an accurate means for providing temperature compensation for the sensor measurements.

SUMMARY OF THE INVENTION

In accordance with the teachings of the present invention, a temperature compensation system is provided for compensating measurements from a sensor. A temperature transducer is placed in close proximity to a manufacturing workstation as a means of measuring the ambient temperature associated with the workstation. A reference workpiece is placed within a sensing zone of the sensor. The system includes a temperature compensating module that is connected to the sensor and to the temperature transducer for determining a baseline measurement of the reference workpiece at a reference temperature. The temperature compensating module is further adapted for collecting a plurality of measurements of the reference workpiece over a plurality of temperatures for establishing a relationship between these measurements and their corresponding temperature values. In addition, a workpiece measuring module is also connected to the sensor and to the temperature transducer for measuring a first workpiece at a first temperature, whereby the sensor measurement is compensated for temperature using this relationship. Rather than compensate for ambient temperature changes, the temperature compensation system may also be adapted to compensate measurements based on process driven temperature changes.

Brief DESCRIPTION OF THE DRAWINGS

Other objects and advantages of the present invention will be apparent to those skilled in the art upon reading the following detailed description and upon reference to the drawings in which.

DESCRIPTION OF THE PREFERRED EMBODIMENT

Figure 1:
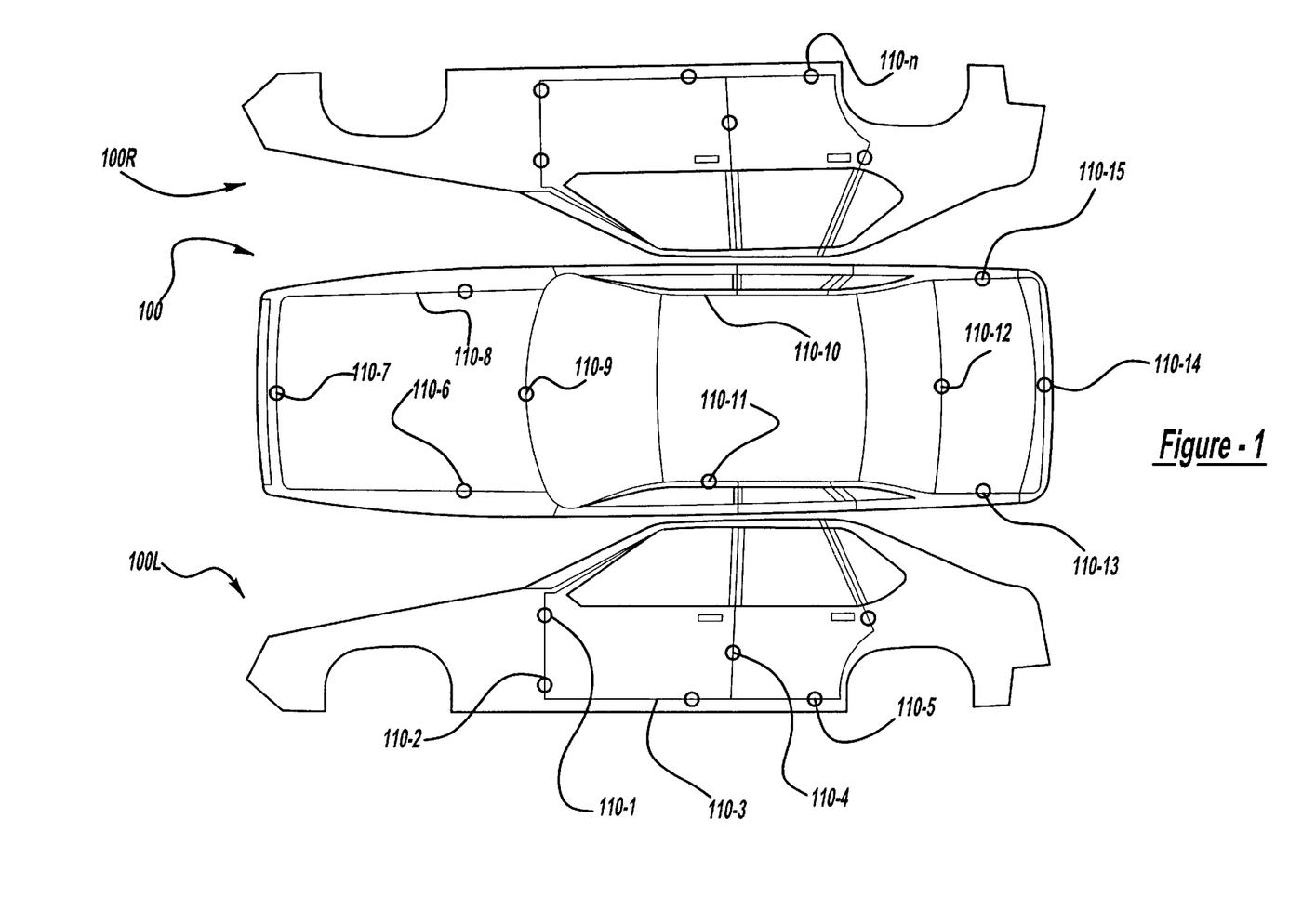
FIG. 1 is a simultaneous top and side view of a portion of an automotive vehicle body, showing typical points of interest which would be placed in the field of view of a plurality of non-contact sensors at a gauging station.

A typical automotive vehicle unibody is shown in FIG. 1. During and after fabrication of the unibody, it is desirable to gauge certain key points on the unibody to monitor the fabrication process. Such miscellaneous points of interest on workpiece 100 are shown as points 110-1 through 110-n. The left side 100L of the vehicle body and the right side 100R of the vehicle body are shown in an "unfolded" view for convenience in FIG. 1. Typical usage of the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled. There are many exemplary sensor arrangements, including the optical arrangement disclosed in U.S. Pat. No. 4,645,348 to Dewar et al., assigned to the assignee of the present invention.

Figure 2:
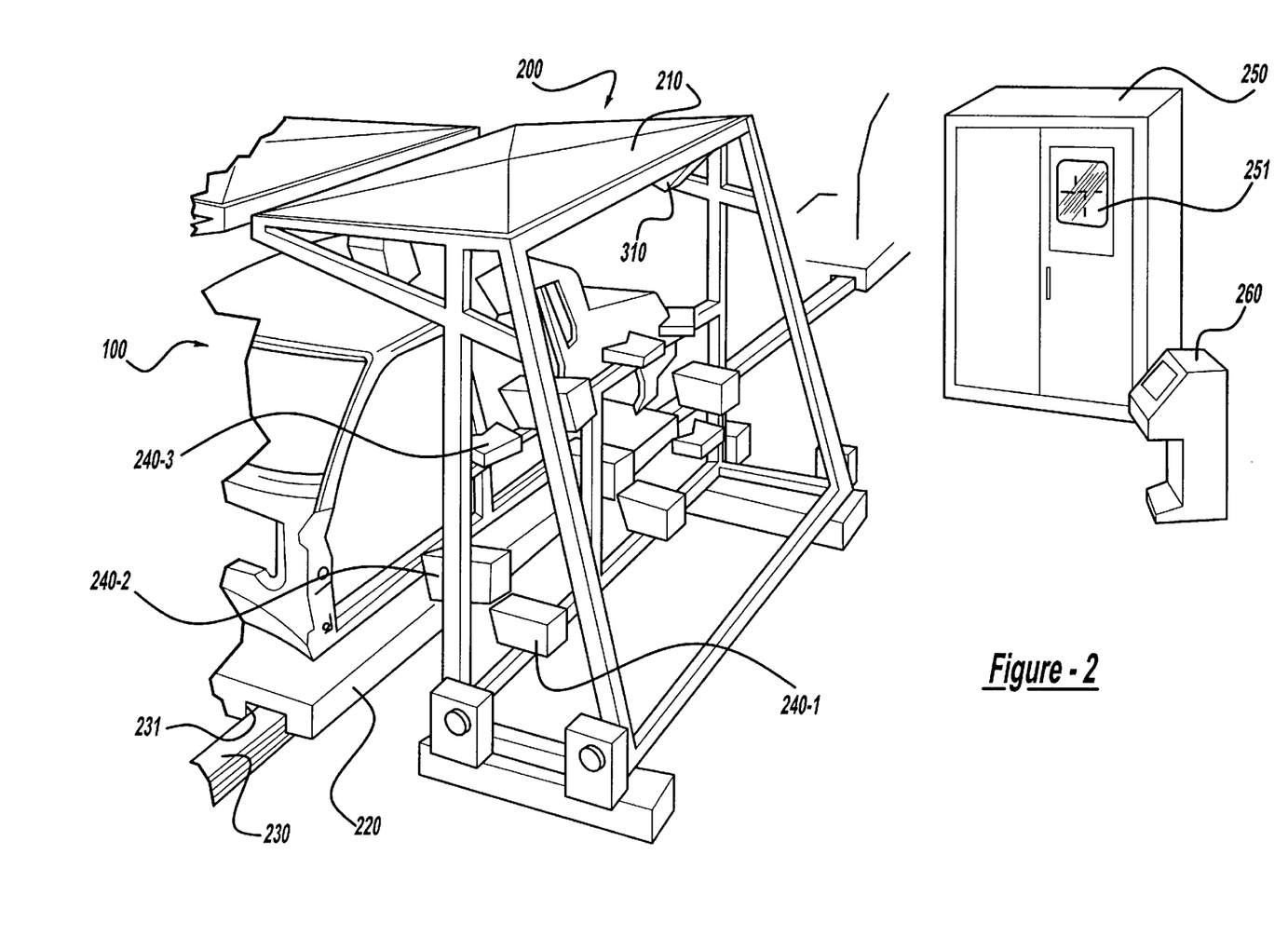
FIG. 2 is a perspective view of a typical gauging station on an automotive assembly line, including a plurality of non-contact sensors to be calibrated in accordance with the principles of the invention.

A typical gauging workstation for an automotive vehicle part as shown in FIG. 1 could take the form shown in FIG. 2. Workpieces to be gauged at gauging workstation 200 rest on transporting pallets 220, which are moved along an assembly line via pallet guides 230 that pass through guide channels 231 in the pallet. It is envisioned that other types of machinery and devices (commonly referred to as workpiece tooling) may be used to move and hold the workpiece at the workstation.

At the gauging workstation 200, a sensor mounting frame 210 (only one half of which is shown in perspective in FIG. 2) surrounds the workpiece 100 to be gauged and provides a plurality of mounting positions for a series of optical gauging sensors 240-1 through 240-n. Each of the sensors 240-1 through 240-n are securely mounted to mounting frame 210. Communication cables which are not specifically shown in FIG. 2 for clarity, couple the sensors 240 to a machine vision computer 250 which includes a CRT or cathode ray tube display 251 and a printer 260. It is also envisioned that contact-type gauging sensors may also be used in accordance with the present invention.

Figure 3:
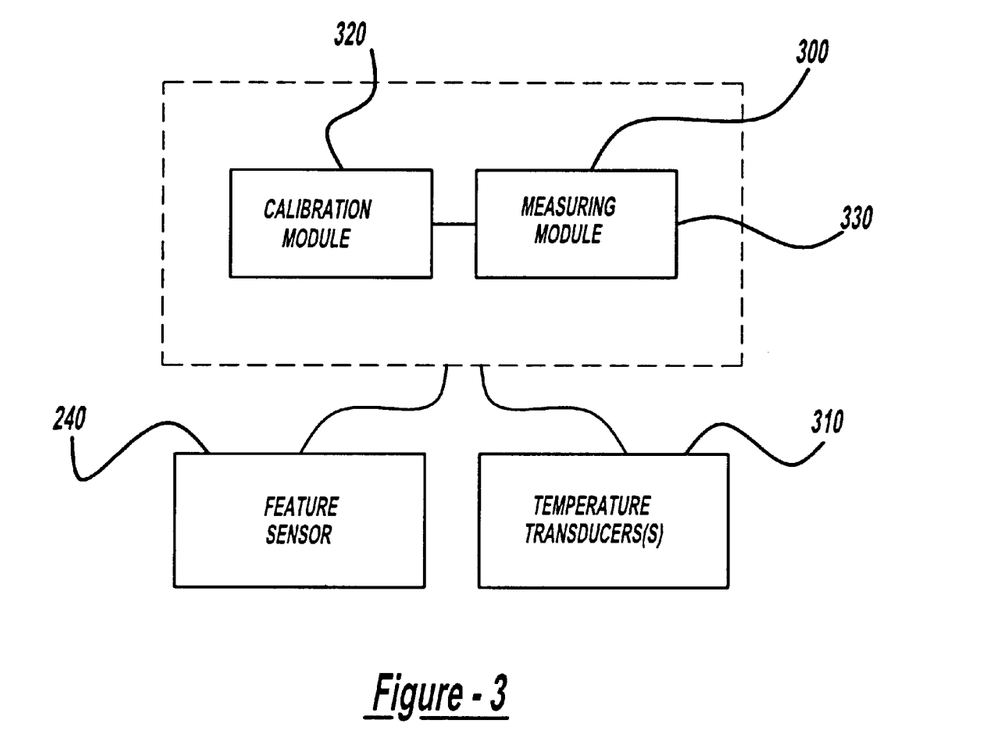
FIG. 3 is a block diagram showing the basic components of the temperature compensation system of the present invention.

Referring to FIG. 3, the temperature compensation system 300 of the present invention may be used to compensate measurements from each of the sensors 240 with respect to a predetermined reference measurement of a master workpiece. A transducer 310 (e.g., a thermocouple) for measuring a temperature associated with the workstation is coupled to sensor mounting frame 210. A calibration module 320 and a workpiece measuring module 330 are each incorporated into computer 250 which is in turn connected to transducer 310 and each of the sensors 240.

Within the typical manufacturing facility, each component of the workstation can be affected by a wide range of temperatures. In the present invention, ambient temperature is preferably used to represent the temperature changes experienced by each of the components in a workstation. Thus, transducer 310 is preferably placed in close proximity to the workstation as a means of measuring ambient temperature. However, due to the close correlation between ambient temperature and the surface temperature of sensor mounting frame 210, an RTD sensor mounted directly onto the surface of sensor mounting frame 210 or another workstation component could also be used in the present invention.

Figure 4:
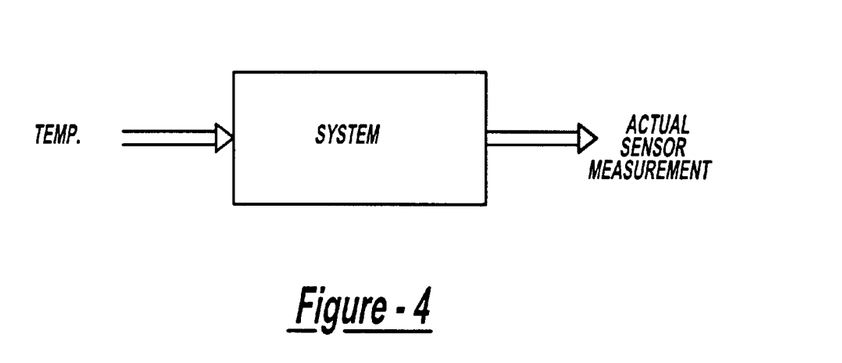
FIG. 4 is a diagram illustrating the system approach taken by a temperature compensation system of the present invention.

To compensate measurements for temperature, temperature compensation system 300 employs a systems approach as depicted in FIG. 4. Each of the components of the workstation that may be affected by variations in temperature are viewed as the system. System components may include, but are not limited to the sensor, sensor mounting hardware, the workpiece, workpiece tooling, and the mounting structure. Rather than model the response of each component to temperature variations, a characteristic curve is developed to represent the response of system as a whole. By using a range of temperatures (as system input) and then determining corresponding sensor measurements for each temperature (as system output), a characteristic curve can be developed for each sensor (or for each reported sensor measurement) of the workstation. In this way, the characteristic curve incorporates all of the variables that may affect a measurement from a particular sensor. A more detailed discussion of this system approach as implemented in the present invention follows.

Figure 5:
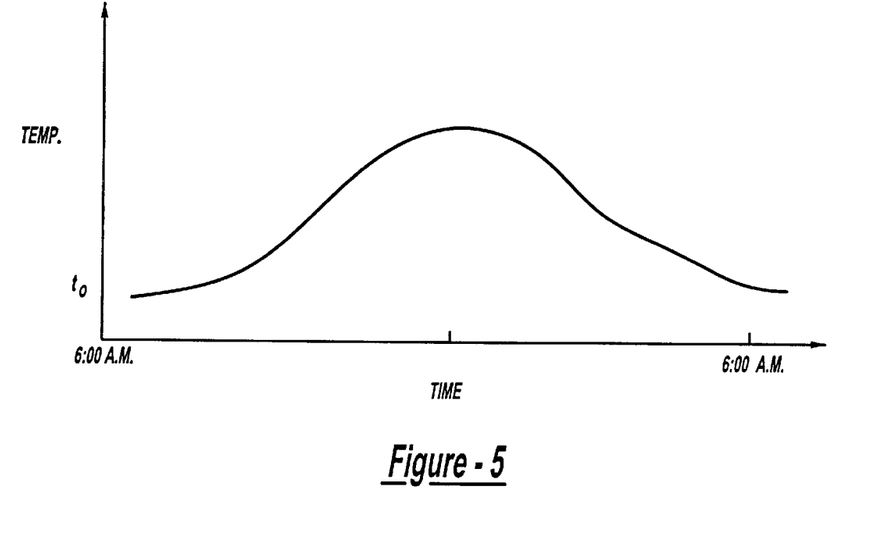
FIG. 5 is a graph illustrating the temperature changes in a manufacturing facility over a typical operational period.

During installation of the workstation, temperature compensation system 300 is calibrated for the temperature variations which occur throughout the operational period of the plant. Temperature changes in the plant generally exhibit a sinusoidal or some other repeatable pattern over the course of an operational period as shown in FIG. 5. Prior to a first shift, the plant may sustain a steady-state value. As tooling starts up and the plant achieves its operational state, ambient temperature within the plant typically increases until a peak temperature for that period is attained. As the plant begins to shut down and during any subsequent maintenance time, temperature decreases. Ambient temperature during any particular operational period may also be affected by other changes in temperature near the workstation and/or outside the plant.

Figure 6:
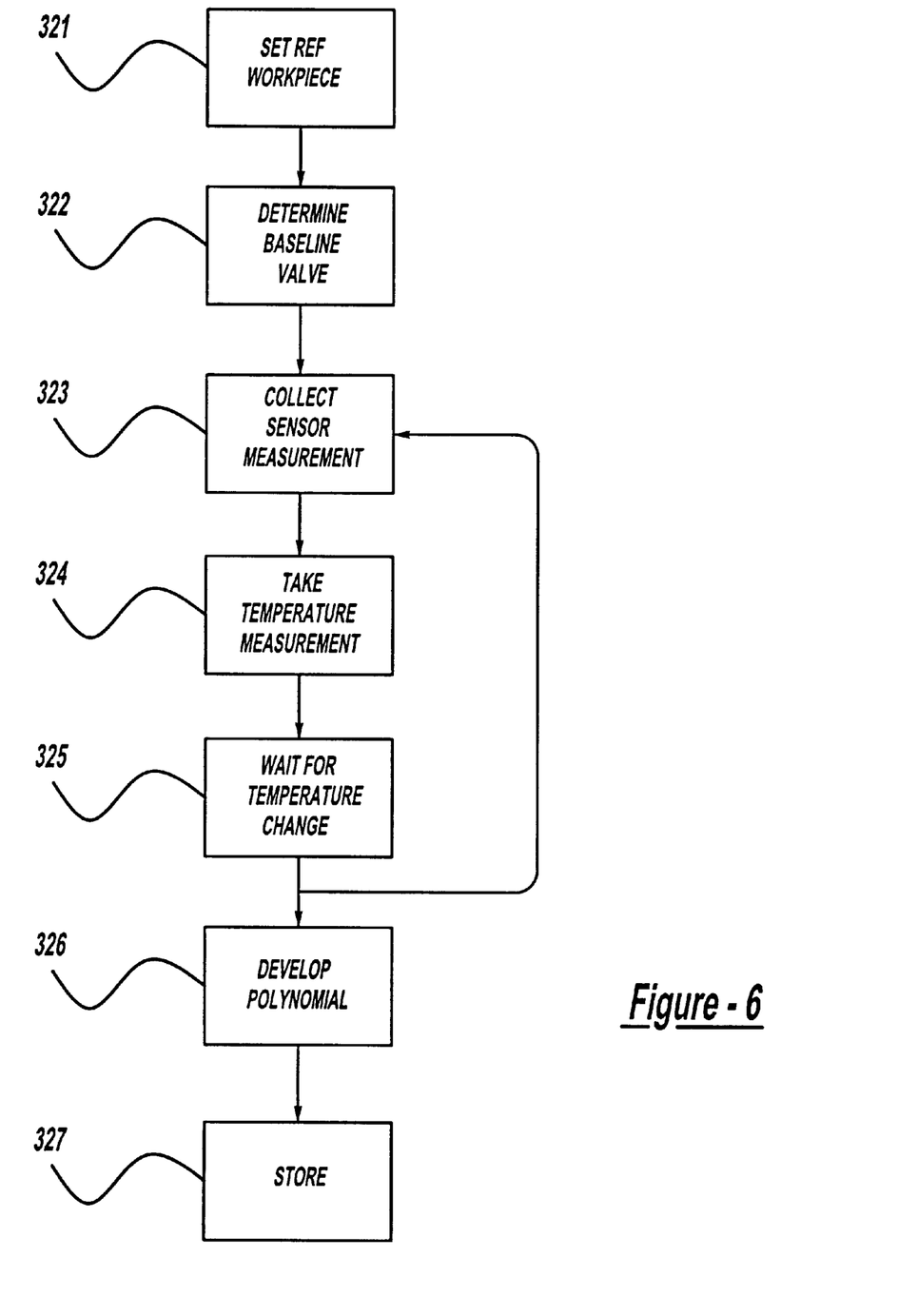
FIG. 6 is a flowchart depicting a preferred implementation of the calibration module of the present invention.

Referring to FIG. 6, a master (or reference) workpiece is locked into the workstation 321 prior to the operational period to calibrate the system. Calibration module 320 determines a baseline or reference value ($x_o$) 322 for each sensor measurement taken by the workstation. These baseline values preferably comprise an average value derived from a plurality of measurements taken at a steady-state ambient temperature ($t_o$).

Figure 7:
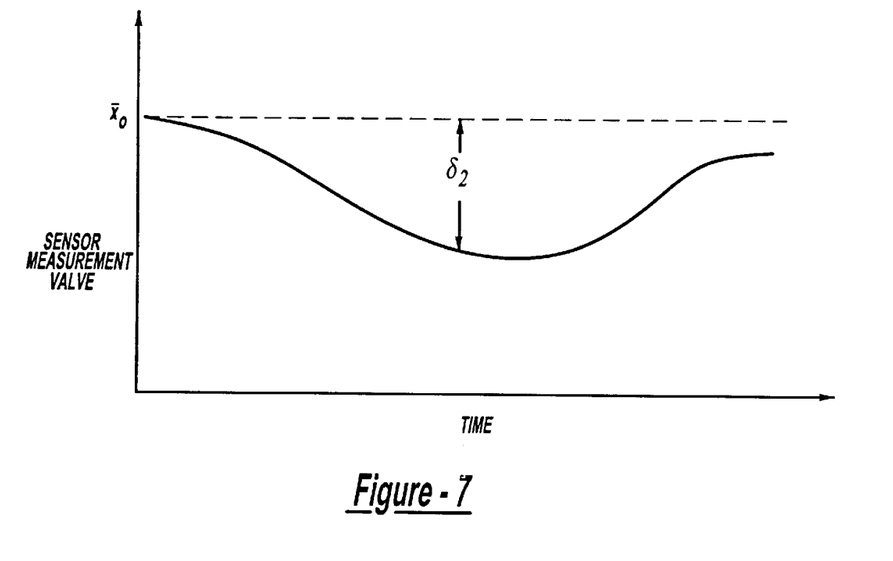
FIG. 7 is a graph illustrating an exemplary response of a sensor's measurements as caused by changes in temperature.

Next, calibration module 320 characterizes the response of each sensor measurement over a range of temperatures. A sensor measurement ($x_i$) of the workpiece 323 along with a corresponding ambient temperature measurement ($t_i$) 324 are captured at the same time by calibration module 320. As the temperature changes 325, additional sensor and temperature measurements are collected. For instance, during a typical operational period at the plant, measurements may be taken at the beginning of the operational period (e.g., 6:00 am) and at periodic intervals (e.g., every 15 minutes) for the remainder of the operational period. Additional data may also be gathered during different operational periods which experience different temperature profiles (e.g., operation when the plant is at full or less than full capacity, operation during summer vs. winter, etc.). In this way, the response of the workstation is captured over a wide range of ambient temperatures. FIG. 7 illustrates a typical response of a sensor's measurements in accordance with changes in temperature.

Using this empirical deviation data, a relationship is established 326 between ambient temperature and sensor measurements. The sensor measurement data ($x_i$) collected by the calibration module are represented by the measurement vector:

$$\vec{x} = \{x_1, x_2, \ldots x_N\}$$

where N=the number of measurements taken The corresponding temperature data ($t_i$) collected by the calibration module are represented by the temperature vector:

$$\vec{t} = \{t_1, t_2, \ldots t_N\}$$

Because there are many variables in the context of the workstation that may cause this data to be non-linear or irregular, a polynomial is developed to approximate this relationship, in the present case a quadratic polynomial is chosen. First, an offset value ($\delta_i$) for each workpiece measurement is obtained by:

$$\delta_i = x_i - x_0$$

Where:

$x_i$ = Sensor Measurement $x_0$ = Baseline Measurement

Next, these offset values can be used to calculate the coefficients ($c_0, c_2, c_2$) for the following polynomial:

$$\tilde{\delta}_i = c_2 t_i^2 + c_1 t_i + c_0$$

The least squares approximation solution for the coefficients is: $A\vec{c} = \vec{b}$ Solving for $\vec{c}$:

$$\vec{c} = A^{-1}\vec{b}$$

Where:

$$\vec{c} = \begin{Bmatrix} c_2 \\ c_1 \\ c_0 \end{Bmatrix} \text{coefficient vector}$$

$$A = \begin{bmatrix} \sum_{i=1}^{i=N} t_i^4 & \sum_{i=1}^{i=N} t_i^3 & \sum_{i=1}^{i=N} t_i^1 \\ \sum_{i=1}^{i=N} t_i^3 & \sum_{i=1}^{i=N} t_i^2 & \sum_{i=1}^{i=N} t_i \\ \sum_{i=1}^{i=N} t_i^2 & \sum_{i=1}^{i=N} t_i & N \end{bmatrix}$$

$$\vec{b} = \begin{Bmatrix} \sum_{i=1}^{i=N} \delta_i t_i^2 \\ \sum_{i=1}^{i=N} \delta_i t_i \\ \sum_{i=1}^{i=N} \delta_i \end{Bmatrix}$$

Accordingly, this polynomial will provide an offset value ($\delta_i$) that is a function of the observed ambient temperature ($t_i$) at the time of a particular sensor measurement. In this way, an equation is developed that incorporates the response of each component and variable in the workstation that may affect a particular sensor measurement. Lastly, the coefficients representing this polynomial are stored 327 for later measurement compensation. Using this system approach, a relationship can be established for each sensor measurement in the workstation.

The quadratic model and its solution described in the above can be extended to a polynomial with more terms which may be needed for modeling the behavior of different mounting schemes. In particular, the empirical modeling technique described herein could be applied to temperature compensate measurements made by a sensor placed into position(s) by a robot. In this case, a single sensor takes each of the temperature compensation measurements via a robot that moves it to different locations within the wordstation. As will be apparent to one skilled in the art, there would be a need for at least two temperature probes, and the model will require higher order polynomials than a quadratic for an anthropomorphic robot. The extra temperature probes would be required due to the independent nature of the heat from the servomotors and the ambient temperature. As will be apparent to one skilled in the art, the method of solution for the case of multiple temperatures and additional polynomial terms is a straight forward extension of the previously described method.

Figure 8:
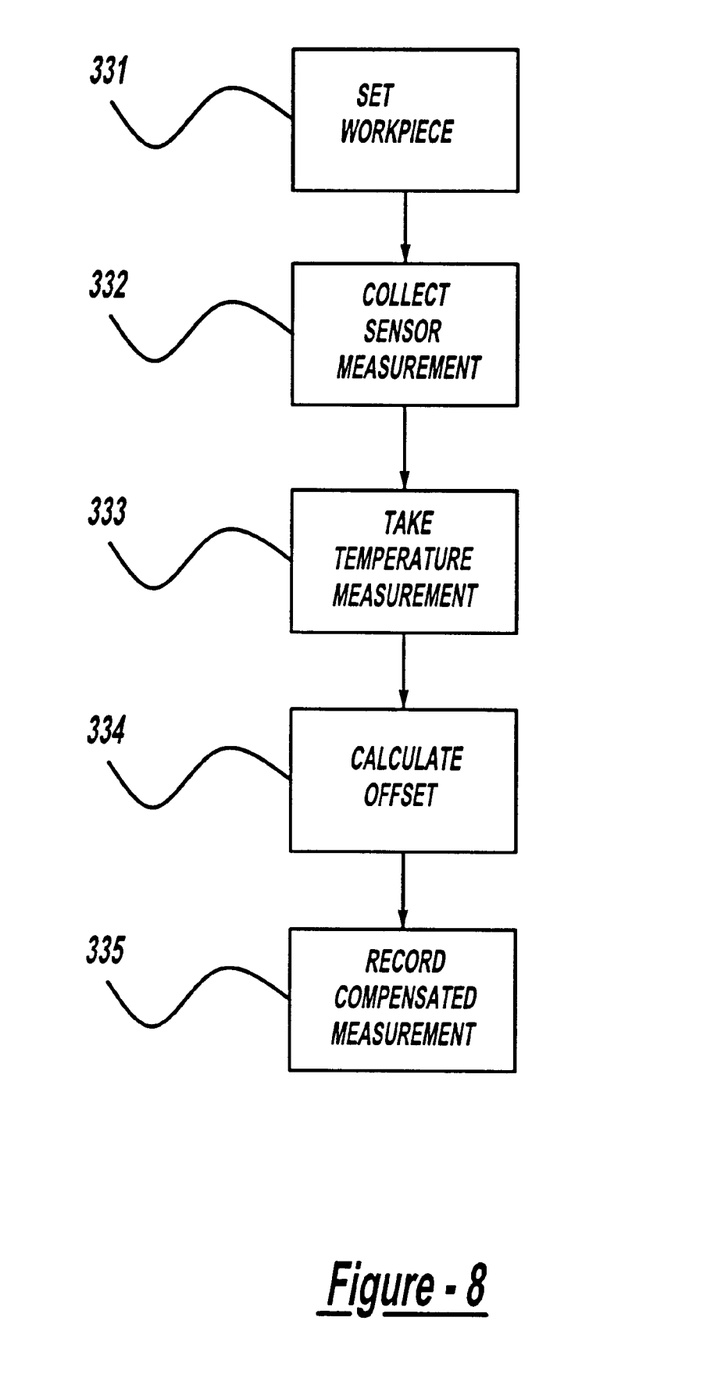
FIG. 8 is a flowchart depicting a preferred implementation of the workpiece measuring module of the present invention.

Workpiece measuring module 330 is used to compensate measurements taken by the station, as shown in FIG. 8. When a workpiece comes into the station 331, a sensor measurement ($X_m$) 332 and ambient temperature measurement 333 are taken by measuring module 330. Measuring module 330 is then able to determine 334 a compensated value for each workpiece measurement. During standard gauging, the compensated value is generated by using the following equation:

$$X_c(T) = c_2 T^2 + c_1 T + c_0 + X_m$$

thereby compensating the measurement with respect to its corresponding baseline value. Lastly, the compensated measurement is recorded 335.

The measurements being compensated have, thus far, been represented by the uppercase scalar X, and the measurement data used to develop the compensation model by the lowercase scalar x. It should be understood that these scalars may represent components of a multidimensional measurement in which case each component of the measurement is compensated independently in the manner described for the generic scalars x and X.

In accordance with the present invention, temperature compensation system 300 may employ a second approach for compensating sensor measurements. In this case, many different types of manufacturing tasks at several different stations are performed at one workstation. For example, a workpiece may be picked up at a first station. At a second station, the workpiece undergoes some automated assembly event. In this case, a door hinge is welded onto a doorframe by an automated welding device. Next, the workpiece moves to a third station where the workpiece is measured and gauged before being dropped off and/or transferred to another workstation in the plant.

As previously discussed, temperature variations associated with the workstation may cause deviations in measurements as taken by its various non-contact sensors. For this type of workstation, fluctuations in temperature are primarily caused by the particular automated assembly event (i.e., welding). In other words, temperatures taken at the weld location are indicative of the temperature changes being experienced throughout the workstation. The workpiece typically arrives at the measuring station within seconds of the welding operation, but there are various factors which may delay its arrival. Any variation in time between welding and measuring alters the temperature associated with the workstation at the time of the measurement, and thus may cause deviations in sensor measurements.

Figure 9:
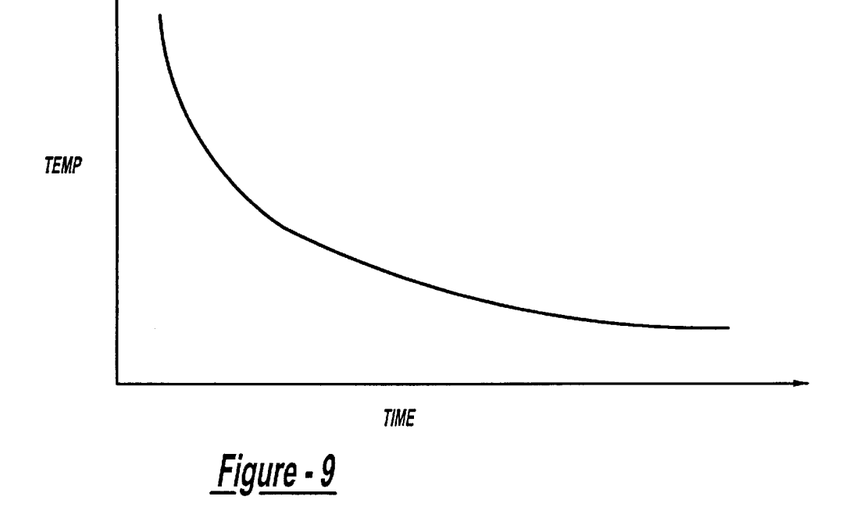
FIG. 9 is a graph illustrating the temperature changes at a weld location following a welding operation.

More specifically, temperature at the weld location immediately following a welding operation (e.g., 600° F.) will decline until it reaches an ambient temperature associated with the workstation as shown in FIG. 9. An infrared non-contact temperature sensor may be directed towards an appropriate location(s) on the welded part for determining this temperature. Because each weld is performed at the same temperature (to maintain weld integrity), the temperature response of the workstation is very consistent and repeatable between workpieces, and therefore lends itself to the system approach of the present invention.

Figure 10:
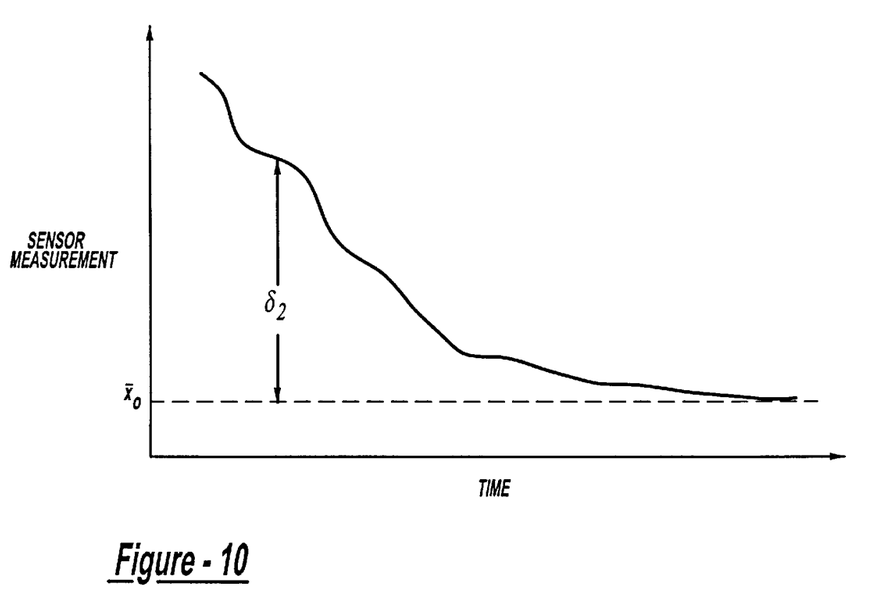
FIG. 10 is a graph illustrating an exemplary response of a sensor's measurements as caused by changes in temperature at the weld location.

Calibration of temperature compensation system 300 varies slightly from the previously discussed approach. First, a master workpiece is locked into the workstation and undergoes the welding operation. Immediately following the welding operation, measurements are taken of the workpiece and a corresponding temperature measurement is captured, such that a relationship is established between temperature and sensor measurements. FIG. 10 illustrates a typical response of a sensor's measurements in accordance with fluctuations in temperature. To accurately capture the exponential response of the system, measurements are preferably taken as often as possible after the welding operation and continue periodically until temperatures reach a steady state.

A baseline value for each sensor measurement is determined after the temperature at the weld location reaches a steady state (e.g., approximately 20–30 minutes after welding operation). In this case, the baseline value is an average value calculated from a plurality of measurements taken after the temperature reaches the steady-state (ambient) temperature.

For the most part, the remainder of the calibration and measurement process is as previously described. In other words, the relationship between temperature and deviations in sensor measurements is represented by a polynomial. Each polynomial (being a function of temperature) provides an offset value for its corresponding sensor measurement depending on the temperature at the weld location at the time of the measurement. Therefore, the temperature compensation system 300 of the present invention can compensate a sensor's measurement with respect to a corresponding baseline value.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention as set forth in the appended claims.

What is claimed is:

1. A temperature compensation system for compensating a measurement of a sensor, said sensor being associated with a manufacturing workstation having a plurality of components, comprising:

a temperature transducer for determining temperature associated with the workstation;

a calibration module connecting to the sensor and said temperature transducer for measuring a reference workpiece placed within a sensing zone of the sensor at a reference temperature;

said calibration module further being adapted for determining a plurality of sensor measurements of said reference workpiece at a plurality of temperatures, and for determining a relationship based on said plurality of sensor measurements and said plurality of temperatures; and a workpiece measuring module connecting to the sensor and said temperature transducer for determining a first sensor measurement of a first workpiece at a first temperature, whereby the first sensor measurement is compensated for temperature using said relationship.

2. The temperature compensation system of claim 1 wherein said relationship compensates the first sensor measurement for varying physical characteristics of at least one of said components of said workstation.

3. The temperature compensation system of claim 1 wherein the components of said workstation are selected from the group consisting of the sensor, a sensor mounting member, a sensor mounting frame, the workpiece and workpiece tooling.

4. The temperature compensation system of claim 1 wherein said temperature is at least one of an ambient temperature in proximity to the workstation and a surface temperature of at least one of said components of the workstation.

5. The temperature compensation system of claim 1 wherein said plurality of sensor measurements of said reference workpiece are determined over an operational period of the manufacturing workstation.

6. The temperature compensation system of claim 1 wherein said temperature is determined at a location associated with an assembly event of the workstation and said plurality of sensor measurements of said reference workpiece are determined after said assembly event.

7. The temperature compensation system of claim 1 wherein said temperature compensation module determines a difference value between each of said plurality of sensor measurements and the reference measurement, and determines said relationship based on said difference values, such that a sensor measurement can be compensated with respect to the reference sensor measurement.

8. The temperature compensation system of claim 1 wherein said relationship is characterized by a quadratic polynomial.

9. The temperature compensation system of claim 1 wherein said sensor being positionable at a plurality of locations proximate to the workstation by a robot, whereby a second sensor measurement of the first work piece at a second temperature is compensated for using said relationship.

10. A method for compensating a measurement of a sensor, said sensor being associated with a manufacturing workstation having a plurality of components, comprising the steps of:

determining temperature associated with the workstation;

measuring a reference workpiece at a reference temperature;

determining a plurality of sensor measurements of said reference workpiece at a plurality of temperatures values;

determining a relationship based on said plurality of sensor measurements and said plurality of temperature values;

determining a first sensor measurement for a first workpiece at a first temperature; and compensating the first sensor measurement of said first workpiece for temperature using said relationship.

11. The method of claim 10 wherein said temperature being at least one of an ambient temperature in proximity to the workstation and a surface temperature of a first component of the workstation.

12. The method of claim 10 wherein said plurality of sensor measurements of said reference workpiece are determined over an operational period of the manufacturing workstation.

13. The method of claim 10 wherein said temperature is determined at a location associated with an assembly event of the workstation and said plurality of sensor measurements of said reference workpiece are determined after said assembly event until temperature reaches a steady-state value.

14. The method of claim 10 wherein the step of determining a relationship further comprises determining a difference value between the reference measurement and each of said plurality of sensor measurements, and determining said relationship based on said difference values, such that said first sensor measurement can be compensated with respect to the reference sensor measurement.

15. The method of claim 10 wherein said relationship adjusts the first sensor measurement for varying physical characteristics of at least one of said components of said workstation.

16. The method of claim 10 wherein said components of said workstation are selected from the group consisting of the sensor, a sensor mounting member, a sensor mounting frame, the workpiece and workpiece tooling.

17. The method of claim 10 wherein the step of determining a relationship further comprises using a quadratic polynomial to represent the relationship between said plurality of sensor measurements and said plurality of temperature values.

18. The method of claim 10 further comprises the steps of:
positioning said sensor at a second location proximate to the work station;
determining a second sensor measurement for the first work piece at a second temperature; and
compensating the second sensor measurement of said first work piece for temperature using said relationship.

* * * * *